(12) United States Patent
Pratt (10) Patent No.: US 6,591,198 B1
(45) Date of Patent: Jul. 8, 2003

(54) SYSTEM AND METHOD FOR CONTROLLING NOISE OUTPUTS OF DEVICES IN RESPONSE TO AMBIENT NOISE LEVELS

(75) Inventor: Thomas L. Pratt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 09/721,565

(22) Filed: Nov. 22, 2000

(51) Int. Cl.[7] .............................................. G01H 17/00
(52) U.S. Cl. ........................ 702/35; 702/56; 369/44.32
(58) Field of Search ............................... 702/39, 35, 56, 702/141; 381/333, 57, 67, 110.121, 122; 369/25.01, 44.32, 53.18; 73/489, 491; 340/669, 683

(56) References Cited

U.S. PATENT DOCUMENTS

| | | | |
|---|---|---|---|
| 5,631,427 A | 5/1997 | Bridges .......................... | 73/68 |
| 5,715,302 A | * 2/1998 | Lee ............................. | 358/468 |
| 5,828,768 A | * 10/1998 | Eatwell et al. .............. | 381/110 |
| 5,893,048 A | 4/1999 | Pate et al. .................... | 702/56 |
| 5,995,364 A | 11/1999 | McAnally et al. .......... | 361/689 |

* cited by examiner

*Primary Examiner*—Kamini Shah
(74) *Attorney, Agent, or Firm*—Haynes and Boone, LLP (57) ABSTRACT

A computer system that includes a processor, a device, and a microphone is provided. The microphone is configured to detect an ambient noise level. The processor is configured to cause a noise output of the device to be changed in response to the ambient noise level.

15 Claims, 5 Drawing Sheets

SYSTEM AND METHOD FOR CONTROLLING NOISE OUTPUTS OF DEVICES IN RESPONSE TO AMBIENT NOISE LEVELS

BACKGROUND

The disclosures herein relate generally to computer systems and more particularly to a system and method for controlling noise outputs of devices in response to ambient noise levels.

A computer system often includes devices such as hard disk drives, CD-ROM drives, and fans that generate acoustic noise. The user of the computer system may perceive the noise generated by these devices as annoying or undesirable. Manufacturers of these devices have responded by creating quiet modes of operation for their devices that may be set by a user. A device may generate less acoustic noise in a quiet mode of operation, but it may not realize its optimal performance in this mode. A user may need to choose either a higher performance mode of operation, where a device generates a higher noise output, or a lower performance mode of operation, where a device generates a lower noise output.

The ambient noise conditions in the environment of a computer system may vary over time. Accordingly, a user's perceived noise from a computer system may vary as well. The noise output generated by a device in a computer system may be considered loud under certain ambient noise conditions and quiet, or unnoticeable, in other ambient noise conditions. It would be inconvenient for the user to need to change a mode of operation of one or more devices in a computer system each time ambient noise conditions changed.

Therefore, what is needed is a system and method for controlling noise outputs of devices in response to ambient noise levels.

SUMMARY

One embodiment, accordingly, provides a computer system that includes a processor, a device, and a microphone. The microphone is configured to detect an ambient noise level. The processor is configured to cause a noise output of the device to be changed in response to the ambient noise level.

A principal advantage of this embodiment is that it allows a computer system to automatically select a mode of operation of one or more devices to generate a suitable noise output relative to an ambient noise level. The computer system may change the mode of operation in response to a change in an ambient noise level to maintain a suitable noise output of the one or more devices.

DETAILED DESCRIPTION

Figure 1:
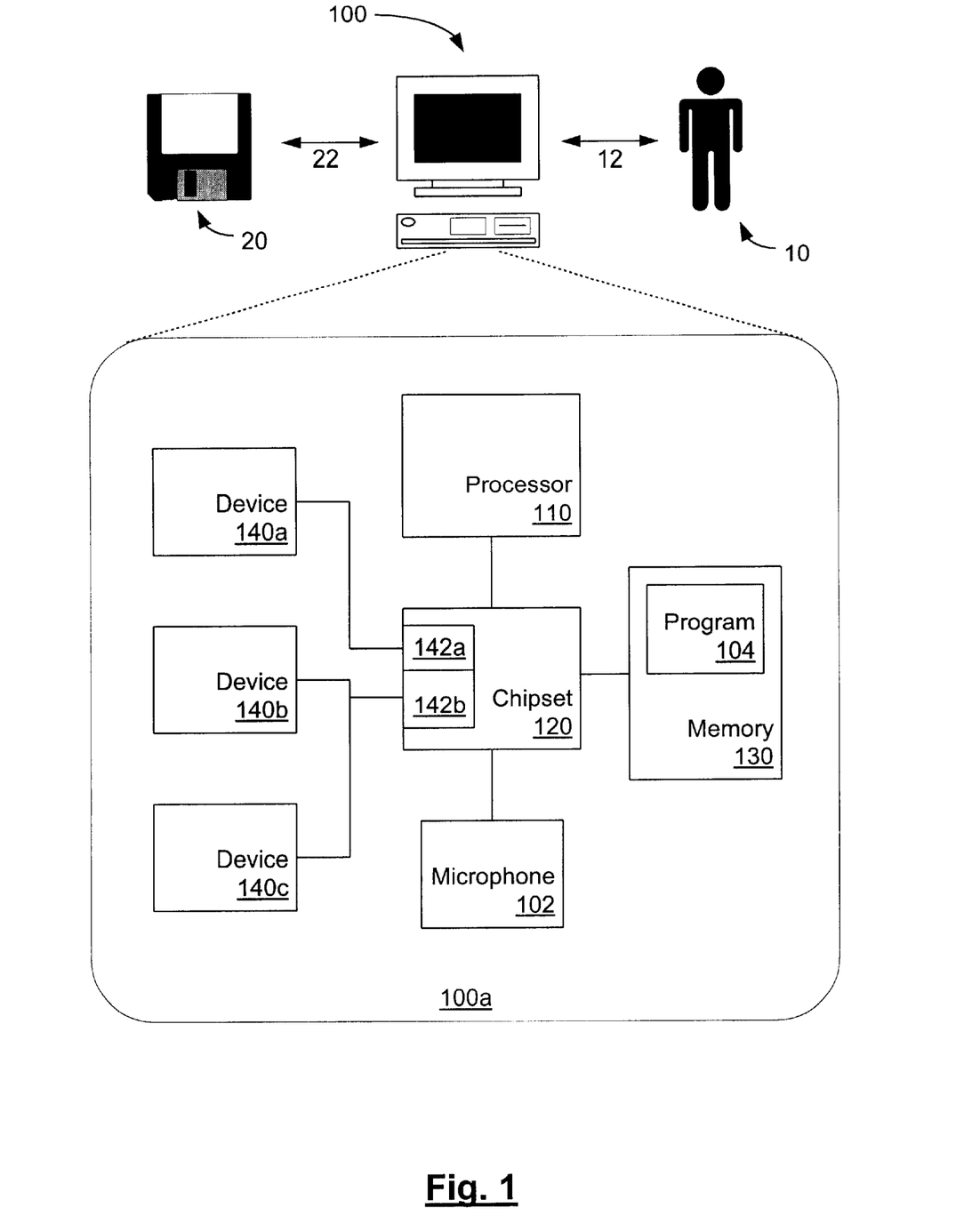
FIG. 1 is a diagram illustrating an embodiment of a computer system.

FIG. 1 is a diagram illustrating an embodiment of a computer system 100.

Computer system 100 operates in association with a human user 10. As indicated by box 100a, computer system 100 includes a processor 110, a memory 130, a device 140a, a device 140b, a device 140c, and a microphone 102 coupled to a chipset 120. Chipset 120 includes a port 142a and a shared bus 142b. Device 140a is coupled to port 142a, and devices 140b and 140c are coupled to shared bus 142b. Memory 130 includes a program 104 that is configured to cause a noise output of devices 140a, 140b, and/or 140c to be changed in response to being executed by processor 110. Program 104 is loaded onto computer system 100 from a computer readable storage media 20. Media 20 may be a floppy disk, a CD-ROM, a hard disk drive, or other storage media accessible and readable by computer system 100. The storage media may be accessed by computer system 100 using a computer network such as an intranet or the Internet.

Computer system 100 is configured to change the noise outputs of devices 140a, 140b, and/or 140c in response to changes in ambient noise levels in the environment of computer system 100. In computer system 100, microphone 102 detects an ambient noise level in the environment of computer system 100. Processor 110 causes a noise output of one or more of devices 140a, 140b, and 140c to be changed in response to the ambient noise level detected by microphone 102.

In computer system 100, devices, such as processor 110 and devices 140a, 140b, and 140c, include selectable modes of operation. These modes of operation may differ in the amount of noise output a device generates as well as the level of performance of a device. The modes of operation may include one or more quiet modes of operation where a device generates a lower noise output than the device might in another mode of operation. The mode of operation of a device is selectable such that processor 110 may cause the mode of operation of a device to be set in response to instructions from program 104. Program 104 may cause inputs 12 regarding selectable modes of operation of devices 140a, 140b, and 140c to be received from user 10.

Devices 140a, 140b, and 140c may each be any device suitable for operation in computer system 100. Examples of such devices include hard disk drives, CD-ROM drives, DVD-ROM drives, floppy disk drives, fans, and other devices that operate in conjunction with a fan. These devices may be connected to a port, a shared bus, or other type of connection in computer system 100 including a direct connection to a printed circuit or mother board that does not couple directly to chipset 120. In the example shown in FIG. 1, device 140a is connected to port 142a and devices 140b and 140c are connected to shared bus 142b. Devices 140a, 140b, and/or 140c may include selectable modes of operation.

The characteristics of the modes of operation of a device, particularly the noise output and performance characteristics, depend on the characteristics of the device itself. In the case of a hard disk drive, for example, the modes of operation vary in the performance level and noise output of the drive. A hard disk drive typically generates increased noise outputs with an increase in a level of performance, such as a seek time of the hard disk drive. Likewise, a decrease in a level of performance of a hard disk drive may generate a lower noise output. The modes of operation of CD-ROM and/or DVD-ROM devices may vary similarly.

As another example, the modes of operation of a fan may vary by a speed setting such as low, medium, and high speed settings. These speed settings may generate differing levels of noise outputs and may be selected according to the desired noise output. A fan may operate alone or in conjunction with another component, e.g. processor 110 or device 140a, 140b, or 140c, in computer system 100 to control temperature characteristics of the component. Where the fan operates in conjunction with another component, the mode of operation of the fan may be set in response to setting a mode of operation of the component associated with the fan. The mode of operation of the fan may be set at the same time as the mode of operation of the component or at different times. For example, a mode of operation of processor 110 may be selected where processor 110 generates less heat than another mode of operation. In this case, the fan may need to be set to a slower mode of operation some time after the mode of operation of processor 110 is set to ensure that the proper thermal characteristics of processor 110 are maintained. The slower mode of operation of the fan may generate a lower noise output.

Modes of operation of the devices just described as well as other devices may include other characteristics.

Although a mode of operation of the device or devices 140a, 140b, and 140c may be selected by user 10 based on the user's noise preferences, ambient noise levels in the environment of computer system 100 may change. As a result of a change of an ambient noise level, user 10 may wish to re-select a mode of operation of one or more devices 140a, 140b, and 140c and may wish to make further changes to a mode of operation in response to further changes in an ambient noise level. In computer system 100, however, user 10 may select a noise suppression feature to enable computer system 100 to automatically change the mode of operation of one or more of devices 140a, 140b, and 140c according to changes in the ambient noise levels.

As will be described below, processor 110 may cause a mode of operation of processor 110 and/or one or more devices 140a, 140b, and 140c to be changed or not changed at different times in response to changes in the ambient noise levels. To simplify the discussion below, device 140 refers to one or more of devices 140a, 140b, and 140c.

In response to the noise suppression feature being selected, computer system 100 monitors ambient noise levels using microphone 102 and program 104. In computer system 100, processor 110 causes a mode of operation of processor 110 and/or device 140 to be changed to cause a noise output of the device to correspond to the detected ambient noise level. The ambient noise levels may be monitored periodically, where the ambient noise level is sampled at predetermined times, or continuously, where the ambient noise level is constantly monitored. In response to receiving information associated with an ambient noise level from microphone 102, processor 110 causes the information to be compared with one or more threshold levels and causes a mode of operation of processor 110 and/or device 140 to be changed in response to this comparison.

In a particular embodiment, program 104 causes ambient noise levels to be detected by microphone 102 and stored in memory 130 for retrieval by processor 110. Program 104 also causes one or more threshold levels to be calculated and stored in memory 130 for retrieval by processor 110. Program 104 also causes information regarding modes of operation of device 140 to be stored for retrieval by processor 110 such that processor 110 may cause a mode of operation of processor 110 and/or device 140 to be changed. Other embodiments may convey information regarding ambient noise levels between microphone 102 and processor 110 in other ways.

Figure 2:
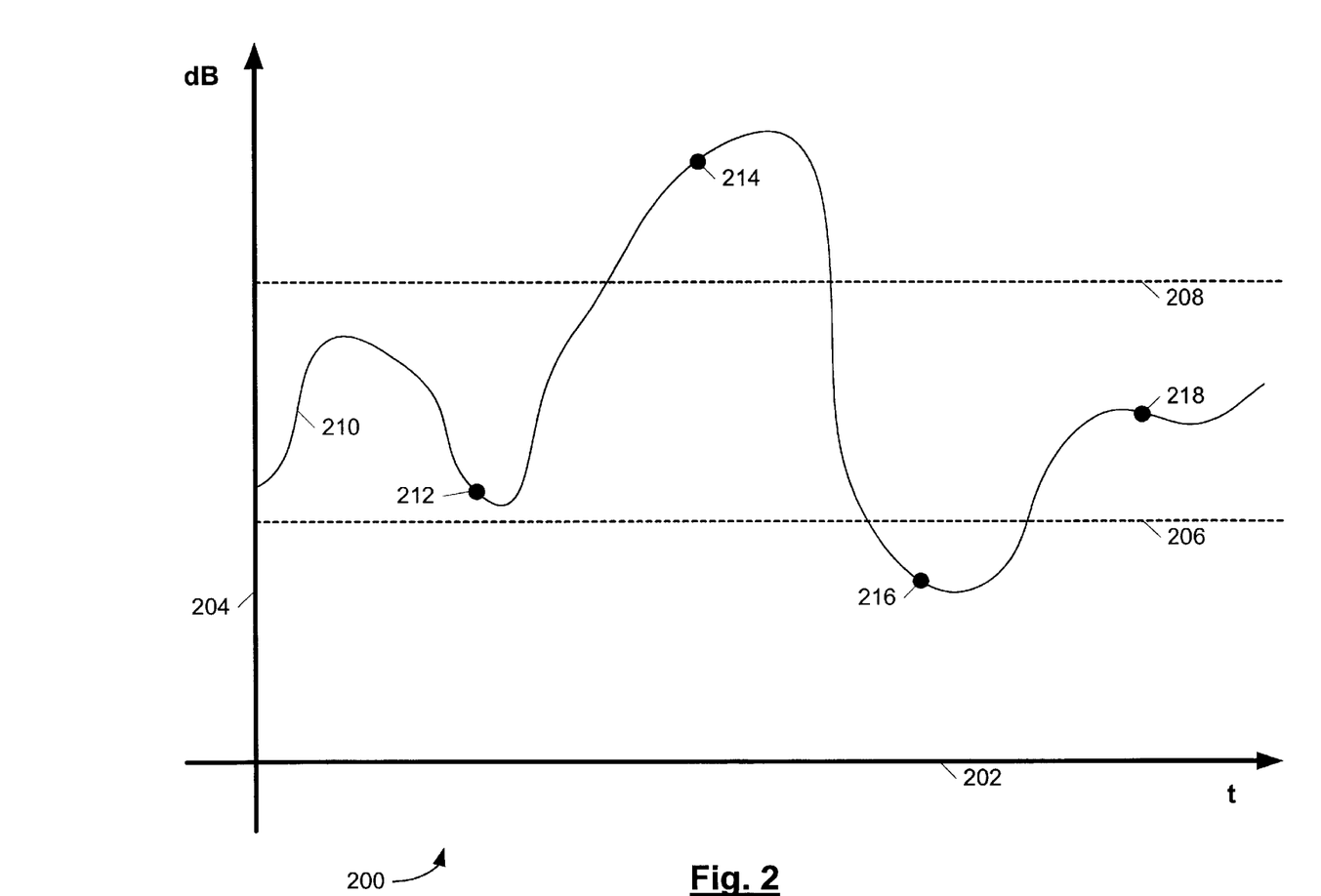
FIG. 2 is a diagram illustrating an example of controlling performance of a device in response to ambient noise levels.

The changes in a mode of operation of devices 140 that processor 110 makes in response to an ambient noise level are illustrated in FIG. 2 which is a graph 200 that shows an ambient noise level curve 210 over time. Time, t, is plotted along x-axis 202, and ambient noise levels are plotted along y-axis 204 in decibels (dB). FIG. 2 includes two threshold levels 206 and 208 that are set in accordance with a calibration or a user preference as will described below.

Processor 110 initially sets a mode of operation of device 140 to produce suitable noise outputs in response to the ambient noise level being between threshold level 206 and threshold level 208. In response to the ambient noise level falling below threshold level 206 or exceeding threshold level 208, processor 110 changes a mode of operation of device 140. The changes to the mode of operation of device 140 at various points in time will now be described.

At point 212, the ambient noise level is between threshold level 206 and threshold level 208. Accordingly, processor 110 does not need to change a mode of operation of devices 140 as the noise output of device 140 is suitable, as indicated by threshold levels 206 and 208, for the level of ambient noise. At point 214, however, the ambient noise level exceeds threshold level 208, i.e. the environment is relatively noisy. Accordingly, processor 110 causes a mode of operation of device 140 to be selected such that the new mode of operation has a relatively higher noise output. As noted above, a performance level characteristic of device 140 may increase with the increase in the noise output of device 140. In such a condition, the increased noise output of device 140 may be unnoticeable or unimportant to user 10 because of the relatively high ambient noise level.

At point 216, the ambient noise level is below threshold 206, i.e. the environment is relatively quiet. Accordingly, processor 110 causes a mode of operation of device 140 to be selected such that the new mode of operation has a relatively lower noise output. A performance level characteristic of device 140 may decrease with the decrease in the noise output of device 140 as noted above. In such a condition, the decreased noise output of device 140 may ensure that the noise generated by device 140 does not disturb user 10 where the environment is relatively quiet.

At point 218, the ambient noise level is between threshold level 206 and threshold level 208. Accordingly, processor 110 causes the mode of operation of device 140 to be reset to its initial value.

A threshold level or levels, such as threshold levels 206 and 208, is set in response to a calibration performed by computer system 100 or in response to a user preference. In response to the noise suppression feature of computer system 100 being selected, user 10 is provided with the opportunity to select a calibration type to be used in setting a threshold level. The choices of calibration types include automatic calibration, interactive calibration, and user selected calibration.

With automatic calibration, program 104 causes one or more threshold levels to be set in response to ambient noise levels in the environment. Program 104 can attempt to discern a normal ambient noise level for the environment using microphone 102. Program 104 calculates the normal ambient noise level based on one time, periodic, or continuous samples of ambient noise levels and causes the threshold level or levels to be set accordingly. Program 104 may change the threshold levels periodically as the normal ambient level of a particular environment changes.

With interactive calibration, program 104 causes user 10 to indicate acceptable versus unacceptable noise outputs for devices 140 and uses the responses from user 10 to set one or more threshold levels. Program 104 causes computer system 100 to interact with user 10 to determine acceptable levels of noise for either individual devices 140 or computer system 100 overall. Program 104 causes noise output samples of a device or devices 140 to be generated for user 10. User 10 responds to these samples by indicating whether particular noise outputs generated by device or devices 140 are acceptable or unacceptable for the environment of computer system 100. Program 104 can cause these samples to be generated for user 10 using each device 140 in turn or can cause these samples to be generated with multiple devices 140 at the same time. In this manner, user 10 provides program 104 with direct feedback as to the acceptable level of noise output for individual devices 140 or computer system 100 overall. In response, program 104 can cause threshold levels to be set individually for each noise generating device 140 or for devices 140 overall.

With user selected calibration, program 104 causes inputs from user 10 to be received and uses the inputs to set one or more threshold levels. The inputs from user 10 may include a generalized description of the noise characteristics of the environment of computer system 100, e.g. quiet, moderate, or noisy, or may include one or more parameters that describe the type of noise profile in which computer system 100 operates. A set of parameters may be stored in computer system 100 as a noise profile. These noise profiles may be identified by descriptive titles that indicate the type of environment where parameters would provide optimal noise outputs from device 140. Examples of such titles include "factory floor", "busy office", and "Bob's home". The parameters used in the noise profiles may include generalized parameters such as generalized noise sensitivity and performance settings, or they may include more specialized parameters that allow user 10 to choose the devices to be affected by the noise suppression feature. A user may choose, for example, to have device 140 operate at a particular level regardless of the noise output of device 140.

Ambient noise levels may include noise generated by devices in computer system 100 whose modes of operation are not controlled by the noise suppression feature. For example, computer system 100 may include speakers that emit music or audio signals in response to inputs from user 10. Computer system 100 may change a mode of operation of device 140 in response to ambient noise levels that are caused from a device associated with computer system 100.

In one particular embodiment, program 104 may include information to allow it to recognize noise patterns characteristic of a particular device 140 in computer system 100. In response to detecting a recognizable noise pattern, computer system 100 may change a mode of operation of the particular device 140.

Devices 140a, 140b, and 140c are shown in FIG. 1 for illustrative purposes. As noted above, devices 140a, 140b, and 140c may each be a hard disk drive, a CD-ROM drive, a DVD-ROM drive, a fan, a device that operates in conjunction with a fan, or other types of devices that may be included in computer system 100. Other embodiments may include other numbers or types of devices that may be coupled to computer system 100 or other types of computer systems, such as a redundant array of inexpensive drives (RAID) system, in other ways. In addition, other devices such as a vibration transducer or other sound or vibration detection device may be substituted for microphone 102.

Figure 3:
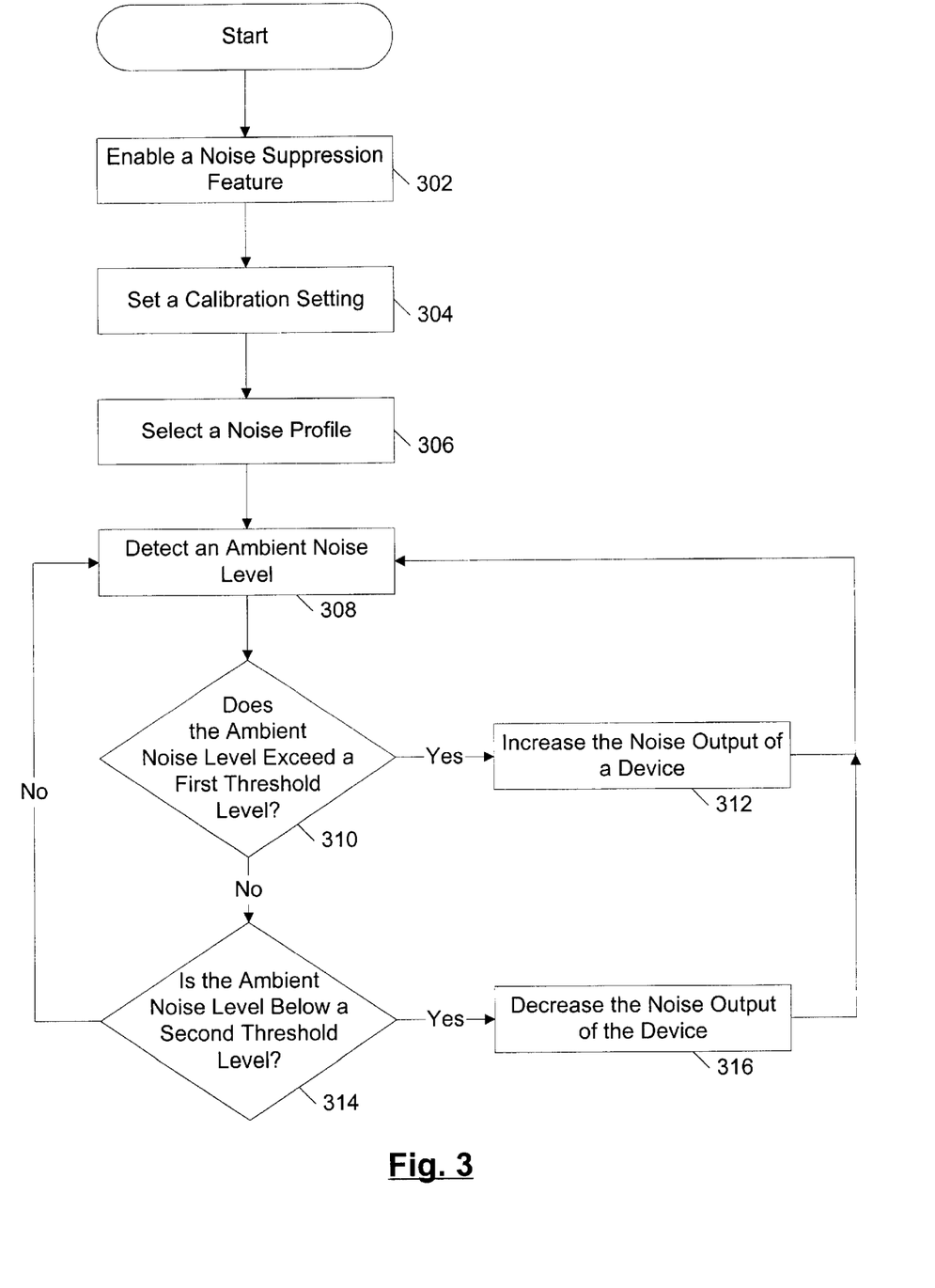
FIG. 3 is a flowchart illustrating an embodiment of a method for controlling performance of a device in response to ambient noise levels.

FIG. 3 is a flowchart illustrating an embodiment of a method for controlling performance of a device in response to ambient noise levels. As shown in FIG. 3, a noise suppression feature is enabled as indicated in step 302. A calibration setting is set as indicated in step 304. The calibration setting may be automatic, interactive, or user selected or may be a combination or variation of these settings. A noise profile is selected as indicated.in step 306. The noise profile may or may not be selected in cases where the calibration setting is set to automatic or interactive.

An ambient noise level is detected as indicated in step 308. A determination is made as indicated in step 310 as to whether the ambient noise level exceeds a first threshold level. If the ambient noise level exceeds the first threshold level, then the noise output of a device is increased as indicated in step 312. The performance level of the device may also increase in response to the noise output being increased as discussed above. The flowchart then returns to step 308 where the ambient noise level is detected at a subsequent time.

If the ambient noise level does not exceed the first threshold level as determined in step 310, then a determination is made as indicated in step 314 as to whether the ambient noise level is below a second threshold level. If the ambient noise level is below a second threshold level, then the noise output of a device is decreased as indicated in step 312. The performance level of the device may also decrease in response to the noise output being decreased as discussed above. The flowchart then returns to step 308 where the ambient noise level is detected at a subsequent time.

If the ambient noise level is not below the second threshold level, then the flowchart returns to step 308 where an ambient noise level is detected at a subsequent time.

Figure 4:
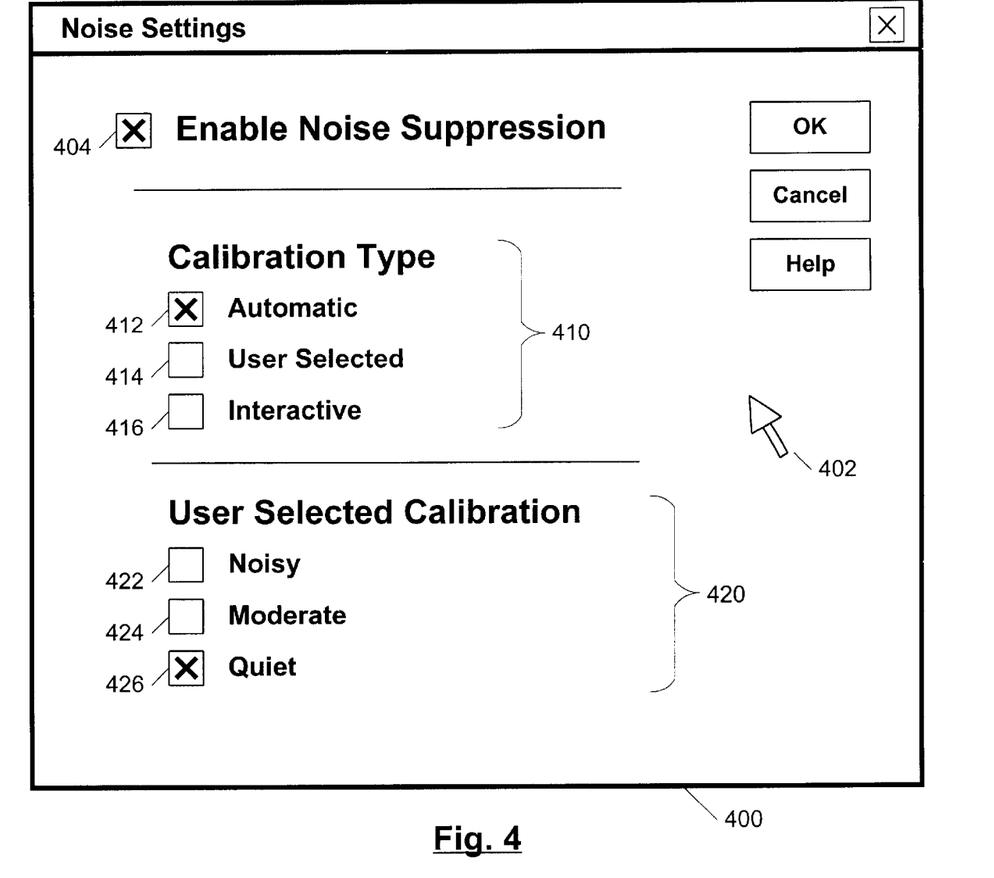
FIG. 4 is a diagram illustrating an embodiment of a menu window displayable by the computer system of FIG. 1.
Figure 5:
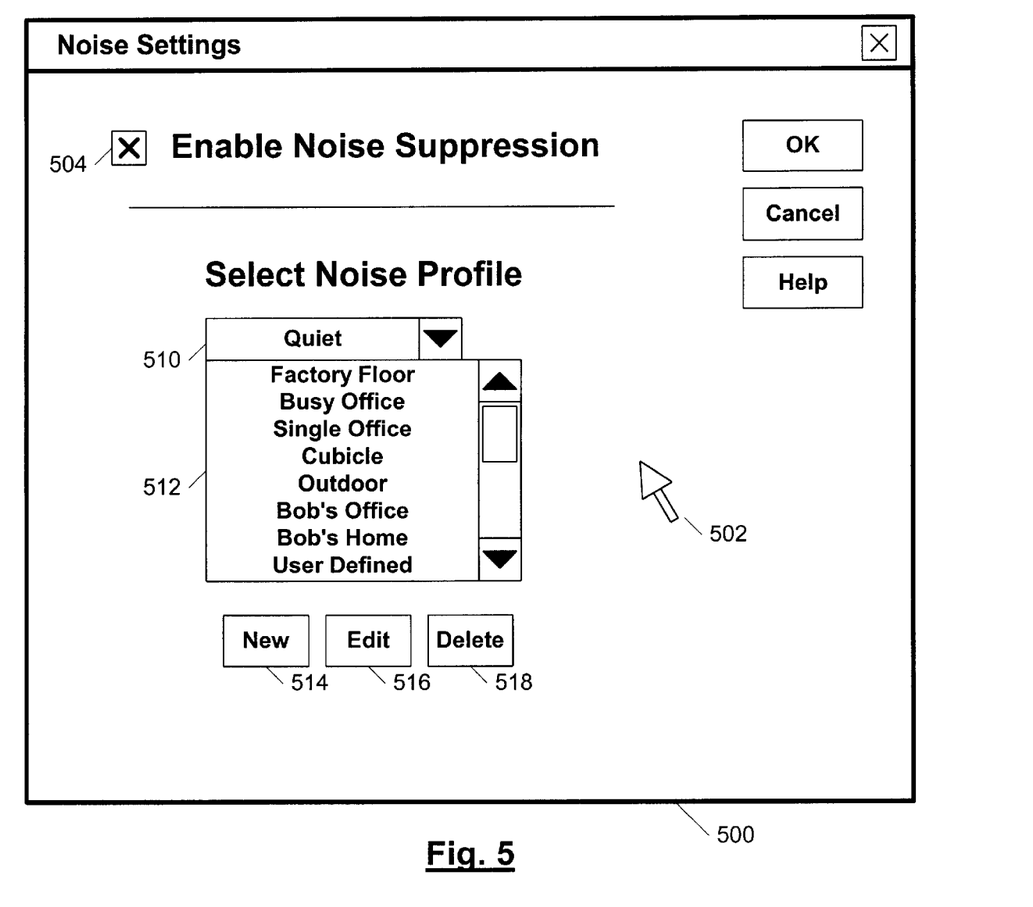
FIG. 5 is a diagram illustrating an embodiment of a menu window displayable by the computer system of FIG. 1.

FIG. 4 and FIG. 5 are diagrams illustrating embodiments of menu windows that may be used to enable a noise suppression feature in a computer system. A user of the computer system may select the features illustrated in FIG. 4 and FIG. 5 using any suitable selection device such as a mouse or a keyboard. A selection device may be used in conjunction with a pointer (e.g. pointer 402 in FIG. 4 and pointer 502 in FIG. 5) displayed in a menu window.

FIG. 4 is a diagram illustrating an embodiment of a menu window 400 displayable by computer system 100 of FIG. 1. Menu window 400 provides a user with a checkbox 404 to enable a noise suppression feature of computer system 100. In response to the noise suppression feature being enabled, computer system 100 changes the noise output of one or more devices 140a, 140b, and 140c in response to an ambient noise level detected by microphone 102 as described above.

After enabling the noise suppression feature, the user selects a calibration type 410. In the embodiment of FIG. 4, the user chooses between automatic calibration, user selected calibration, and interactive calibration as indicated by checkboxes 412, 414, and 416, respectively. In response to the user choosing automatic calibration, computer system 100 determines the threshold level or levels in response to input from microphone 102 as described above. In response to the user choosing user selected calibration, the user selects a user selected calibration type 420. User selected calibration types 420 include a noisy setting, a moderate setting, and a quiet setting that may be selected using checkboxes 422, 424, and 426, respectively. A user selected calibration type 420 may be set based on the expected ambient noise levels in the environment of computer system 100. In response to the user choosing interactive calibration, computer system 100 provides noise output samples to the user and receives inputs from the user associated with the samples. Computer system 100 determines the threshold level or levels in response to the inputs from the user.

FIG. 5 is a diagram illustrating an embodiment of a menu window 500 displayable by computer system 100 of FIG. 1. Menu window 500 provides a user with a checkbox 504 to enable a noise suppression feature of computer system 100. In response to the noise suppression feature being enabled, computer system 100 changes the noise output of one or more devices 140a, 140b, and 140c in response to an ambient noise level detected by microphone 102 as described above.

After enabling the noise suppression feature, the user selects a noise profile 510 from a list of noise profiles 512. As shown in FIG. 5, these noise profiles can be referenced by a descriptive name according to the type of environment they describe such as factory floor or busy office. The noise profiles differ in one or more parameter settings that are used to create threshold levels for comparison to ambient noise levels detected by microphone 102.

Using buttons 514, 516, and 518, a user creates, edits, and deletes noise profiles, respectively. In creating a noise profile after selecting button 514, a user inputs one or more parameters and a name for the noise profile. The noise profile will appear in the list of noise profiles 512. The user may then edit the name of one or more parameters in the noise profile or delete the noise profile altogether. The noise profiles allow a user to select different noise profiles for different environmental conditions. For example, the environmental conditions at a particular location where computer system 100 is used may be different at different times of the day. Likewise, computer system 100 may be a mobile or laptop computer system and may be used in different locations that have different environmental conditions.

As can be seen, the principal advantages of these embodiments are that they allow a computer system to automatically select a mode of operation of one or more devices to generate a suitable noise output relative to an ambient noise level. The computer system may change the mode of operation in response to a change in an ambient noise level to maintain a suitable noise output of the one or more devices. Suitable noise outputs of a device or devices may be set according to a user preference based on the overall ambient noise in the environment of the computer system. The user preference may take the form of a noise profile where a user sets one or more parameters related to the environment of the computer system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A computer system comprising:
   a processor;
   a device coupled to the processor;
   a microphone coupled to the processor and configured to detect an ambient noise level, the processor configured to cause a noise output of the device to be changed in response to the ambient noise level;
   a user selected noise suppression feature to enable the computer system to change a mode of operation of a device in the system according to changes in the ambient noise level; and
   in response to the noise suppression feature being selected, a user selected calibration type for setting a threshold level, the calibration type selected from one of:
      an automatic calibration;
      an interactive calibration; and
      a user selected calibration.

2. The computer system of claim 1, wherein the noise output is associated with a performance level of the device.

3. The computer system of claim 1, wherein the device comprises a hard disk drive.

4. The computer system of claim 1, wherein the device comprises a CD-ROM drive.

5. The computer system of claim 1, wherein the device comprises a fan.

6. A method performed by a computer system comprising:
   detecting an ambient noise level;
   in response to detecting the ambient noise level, changing a noise output of a device in the computer system;
   providing a user selected noise suppression feature to enable the computer system to change a mode of operation of a device in the system according to changes in the ambient noise level; and
   in response to the noise suppression feature being selected, the user selecting a calibration type for setting a threshold level, the calibration type selected from one of:
      an automatic calibration;
      an interactive calibration; and
      a user selected calibration.

7. The method of claim 6, further comprising:
   in response to the ambient noise level exceeding the threshold level, causing a the noise output of the device to be increased.

8. The method of claim 6, further comprising:
   in response to the ambient noise level being below the threshold level, causing the noise output of the device to be decreased.

9. The method of claim 6, further comprising:
   enabling a noise suppression feature of the computer system.

10. The method of claim 6, further comprising:
    in response to detecting the ambient noise level, changing a performance level of a device in the computer system, the performance level being associated with the noise output of the device.

11. A computer program product comprising:
    a computer program processable by a computer system for causing the computer system to:
       detect an ambient noise level;
       provide a user selected noise suppression feature to enable the computer system to change a mode of operation of a device in the system according to changes in the ambient noise level;
       in response to the noise suppression feature being selected, provide a user selected calibration type for setting a threshold level, the calibration type selected from one of:
          an automatic calibration;
          an interactive calibration; and
          a user selected calibration; and
    an apparatus from which the computer program is accessible by the computer system.

12. The computer program product of claim 11, the computer program processable by the computer system for causing the computer system to:
    increase the noise output of the device in response to the ambient noise level exceeding the threshold level.

13. The computer program product of claim 11, the computer program processable by the computer system for causing the computer system to:

decrease the noise output of the device in response to the ambient noise level being below the threshold level.

14. The computer program product of claim 11, the computer program processable by the computer system for causing the computer system to:

receive a user input to enable a noise suppression feature.

15. The computer program product of claim 11, the computer program processable by the computer system for causing the computer system to:

in response to detecting the ambient noise level, change a performance level of a device in the computer system, the performance level being associated with the noise output of the device.

* * * * *